(12) United States Patent
Tejima

(10) Patent No.: US 6,902,168 B2
(45) Date of Patent: Jun. 7, 2005

(54) SLIDING ELEMENT

(75) Inventor: Yoshihiro Tejima, Sakado (JP)

(73) Assignee: Eagle Industry Co., Ltd., Tokyo (JP)

( * ) Notice: Subject to any disclaimer, the term of this patent is extended or adjusted under 35 U.S.C. 154(b) by 62 days.

(21) Appl. No.: 10/390,043

(22) Filed: Mar. 18, 2003

(65) Prior Publication Data

US 2003/0178781 A1 Sep. 25, 2003

(30) Foreign Application Priority Data

Mar. 19, 2002 (JP) .......................... 2002-076545

(51) Int. Cl.$^7$ .............................................. F16J 15/34
(52) U.S. Cl. ...................................... 277/399; 277/400
(58) Field of Search .................... 277/358, 399–401, 277/408

(56) References Cited

U.S. PATENT DOCUMENTS

| | | | | |
|---|---|---|---|---|
| 5,080,378 A | | 1/1992 | Kagawa | |
| 5,092,612 A | * | 3/1992 | Victor et al. | 277/400 |
| 5,952,080 A | * | 9/1999 | Etsion et al. | 428/156 |
| 6,149,160 A | * | 11/2000 | Stephens et al. | 277/399 |
| 6,152,452 A | * | 11/2000 | Wang | 277/400 |
| 6,325,380 B1 | * | 12/2001 | Feigl et al. | 277/352 |
| 6,341,782 B1 | * | 1/2002 | Etsion | 277/399 |
| 6,425,583 B1 | * | 7/2002 | Muraki | 277/358 |
| 6,655,693 B2 | * | 12/2003 | Hosanna et al. | 277/358 |
| 2002/0014743 A1 | * | 2/2002 | Zheng | 277/358 |

FOREIGN PATENT DOCUMENTS

| | | | | |
|---|---|---|---|---|
| DE | 3819566 A1 | * | 12/1989 | F16J/15/44 |
| FR | 1.597.609 | | 6/1970 | |
| JP | 57161368 | | 10/1982 | |
| JP | 04078379 A | * | 3/1992 | F16J/15/34 |
| JP | 09133222 | | 5/1997 | |
| WO | WO 02/04844 A2 | | 1/2002 | |

* cited by examiner

Primary Examiner—Robert J. Sandy
Assistant Examiner—Vishal Patel
(74) Attorney, Agent, or Firm—Arent Fox PLLC

(57) ABSTRACT

A primary objective of the present invention is to decrease the friction coefficient of the sliding face of a sliding element and to improve its seal performance. The sliding element disposes a plurality of elongate dimples in the outer circumferential region and the inner circumferential region relative to a boundary reference line and the inclination of the dimples located in the outer circumferential region is different from that of the dimples located in the inner circumferential region. The longitudinally forward edge of the outer circumferential dimples relative to a rotational direction is inclined toward the outer circumference and the longitudinally forward edge of the inner circumferential dimples relative to a rotational direction is inclined toward the inner circumference.

11 Claims, 9 Drawing Sheets

SLIDING ELEMENT

BACKGROUND OF THE INVENTION

1. Field of the Invention

The present invention relates generally to a sliding element for a mechanical seal or the like. More particularly, the invention relates to a sliding element which reduces a friction coefficient on the sliding surface and prevents a process fluid from leaking from the sliding surface.

2. Description of the Related Art

Related art of the present invention is found in U.S. Pat. No. 5,080,378. The description and drawings of U.S. Pat. No. 5,080,378 discloses a mechanical seal as shown in FIG. 8. This mechanical seal 100 is located between a rotary shaft 130 and a housing 140. The mechanical seal 100 is used for sealing a fluid like water in pumps or refrigerators.

In this mechanical seal 100, a rotary seal ring 101 made of sintered porous silicon carbide is fitted over the rotary shaft 130. The rotary seal ring 101 retains a seal face 102 on its side surface. Furthermore, packings 120A, 120B are disposed in a step shoulder 103 of the inner diameter surface of the rotary seal ring 101 to seal against the rotary shaft 130.

The packings 120A, 120B are pressed by a gland ring 105 and seal the interface of the rotary shaft 130 and the rotary seal ring 101. A support ring 109 which is fixed to the rotary shaft 130 by means of a socket screw 108 supports a spring element 106, and the gland ring 105 is resiliently urged by the spring element 106.

An opposing seal face 111 which forms a slidably sealing contact with the seal face 102 is disposed in a fixed seal ring 110. The fixed seal ring 110 is secured via O-rings 115,115 to a bore of the housing 140 through which the rotary shaft 130 extends. This fixed seal ring 110 is made of carbon.

In a conventional mechanical seal 100 arranged as mentioned above, the rotary seal ring 101 and the fixed seal ring 110 slide with respect to each other while maintaining a sealing therebetween in order to seal a higher pressure side P1 from a lower pressure side P2.

The rotary seal ring 101 has a sintered silicon carbide body in which spherical pores whose average diameter is in a range of from 0.010 mm to 0.040 mm are spread within its crystalline structure, and a process fluid captured inside the pores reduces a sliding friction.

The pores located in the sliding surface of the sintered silicon carbide body are fabricated by adding polystyrene beads in a pre-sintering process and then resolving and sublimating them in a temporary sintering. This process provides a sintered silicon carbide body with pores scattered inside the crystal and penetration of the process fluid into them. From a fabrication standpoint, a difficulty in high compression molding causes a decrease in dimensional accuracy of the molded product. Also polystyrene beads resolved in the sintering process decreases the strength of a sintered material as a sliding element.

There is an enhanced version of mechanical seal which improves the aforementioned problems in terms of the strength decrease of the sliding element and the process fluid leakage.

This mechanical seal has the same constitution as what is shown in FIG. 8. FIG. 9 shows a rotary seal ring 205 disposed in the mechanical seal. The sliding faces of the rotary seal ring 205 fixed to a rotary shaft and a fixed seal ring retained in the housing form a sealing contact to seal a process fluid.

The sliding face of the rotary seal ring 205 retains a lot of concaves 206. Minimum width of the concave 206 is in a range of from $30\times10^{-6}$ m to $100\times10^{-6}$ m while the maximum width is in a range of from $60\times10^{-6}$ m to $500\times100^{-6}$ m, and the maximum width is more than twice in dimension of the minimum width.

The grooves 206 prevent the process fluid entering from the outer circumference side between the sliding face 205A of the rotary seal ring 205 and the seal face of the fixed seal ring from bleeding to the inner circumference.

The sealing situation is further explained in details. The process fluid entering from the outer circumference side of the rotary seal ring 205 is trapped and stored in the concave 206 on its way to the inner circumference side. The fluid stored in the concave 206 is pushed back from the outer circumferential edge to the fluid side as the result of the radially outward movement of the fluid relative to the concave 206 due to viscosity of the fluid and rotary motion of the rotary seal ring 205. However, this kind of concave 206 is nothing but a segmented arrangement of a conventional spiral groove as shown in FIG. 9, and its pumping effect to push back the process fluid is small. Also a decrease in the friction coefficient of the sliding face for reducing the heat generation due to friction cannot be expected.

Also there has been other prior art sliding element for mechanical seals. The sliding face of the sliding element for mechanical seals disposes plural dimples lined up like a groove along a longitudinal direction which is vertical to a sliding direction. Dynamic pressure generated within the dimples is fairly large. Thus, a lubricant oil film of the fluid is formed thick and a pushing back force to the process fluid side becomes small, hence a decrease in a seal performance.

The present invention is introduced to resolve the above mentioned problems. A primary technical goal which this invention tries to achieve is to form a film of process fluid on a sliding face by utilizing a sliding effect for reducing a frictional resistance and effectively retaining the incoming fluid on the sliding face.

Another goal is to prevent friction and heat generation on the sliding face which may cause a squeaking noise or a torque variation on the sliding face, which will lead to a wear of the face due to fluctuations.

Yet another goal is to push back a process fluid penetrating into the sliding face gap by means of dimples and to prevent the fluid residing on the sliding face from bleeding to an atmospheric side.

Yet another goal is to preserve strength of the sliding face of the sliding element, to prevent damage of the sliding face, and to enhance the durability.

SUMMARY OF THE INVENTION

A primary object of the present invention is to resolve the above mentioned technical problems, and a solution to such problems is embodied as follows.

A preferred embodiment of a sliding element constructed in accordance with the principles of the present invention is a sliding element for providing a seal against a process fluid between sliding faces of a pair of relatively slidable components, one of the components being a stationary sliding element and the other being a rotary sliding element, and the process fluid being located around either inner circumference or outer circumference of the sliding faces.

The sliding face of the sliding element disposes a plurality of elongate dimples in an outer circumferential region and an inner circumferential region, respectively, with respect to a boundary reference line in which the inclined angle of the outer circumferential dimples being different from that of the inner circumferential dimples, the longitudinally forward edge of the outer circumferential dimples relative to a rotational direction being inclined toward the outer circumference and the longitudinally forward edge of the inner circumferential dimples relative to a rotational direction being inclined toward the inner circumference.

In the preferred embodiment of a sliding element constructed in accordance with the principles of the present invention, as the longitudinally forward edge of the outer circumferential dimples relative to a rotational direction is inclined toward the outer circumference and the longitudinally forward edge of the inner circumferential dimples relative to a rotational direction is inclined toward the inner circumference, a thick lubrication film is retained on the sliding face between the outer circumferential dimples and the inner circumferential dimples, the lubrication film being able to decrease a friction coefficient of the sliding face. In addition, a torque variation as well as a squeaking noise of the sliding face are prevented. As the result, a wear due to the fluctuation is also effectively prevented. Pumping effect of the process fluid caused by the dimples will further enhance the seal performance.

DETAILED DESCRIPTION OF THE INVENTION

Described below is details of the figures of preferred embodiments of a sliding element of the present invention according to actual design drawings with accurate dimensional relations.

Figure 1:
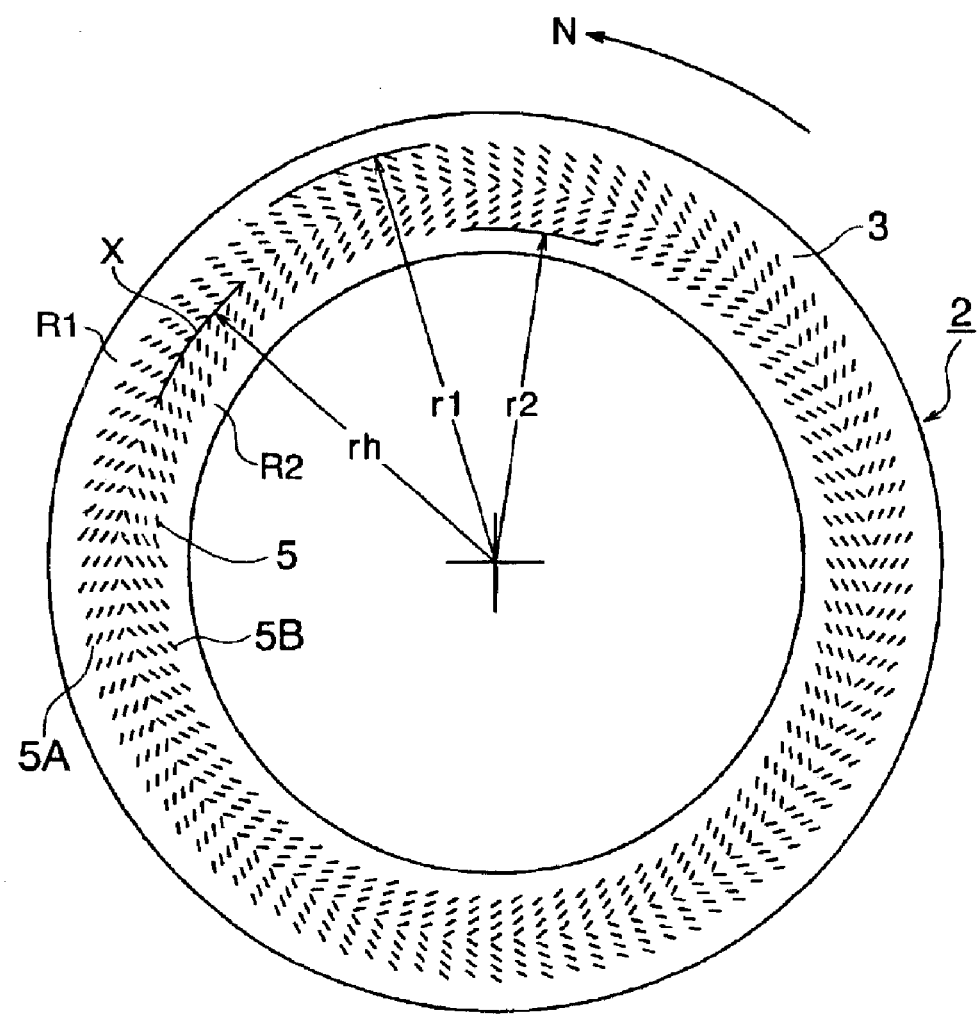
FIG. 1 is a front view of a sliding face of a sliding element representing a first preferred embodiment related to the present invention.

FIG. 1 shows a first embodiment of the present invention. Dimples 5 are constituted by dimples 5A located in the outer circumferential side and dimples 5B located in the inner circumferential side both of which are disposed on a sliding face 3 of a sliding element 2.

A circle located in the middle of the outer circumferential dimples 5A and the inner circumferential dimples 5B defines a boundary reference line X. An outer circumferential radius of the outer boundary of an array of the outer circumferential dimples 5A is r1. Also an inner circumferential radius of the inner boundary of an array of the inner circumferential dimples 5B is r2. And a radius of the boundary reference line is rh.

The boundary reference line X is designed by taking account of seal ability of a sliding face, and the circle defined by the boundary reference line X separates an outer circumferential region R1 and an inner circumferential region R2. In this first embodiment, a boundary reference line X is located in the middle of the sliding face, and the number of outer circumferential dimples 5A is designed equal to that of inner circumferential dimples 5B.

Also a shape of the dimples 5A, 5B of the first embodiment when viewed from the top is either oblong or elliptical, and inclination angles C, C' relative to a radial direction are in a range of from 45 to 85 degrees, preferably from 60 to 80 degrees.

Figure 2:
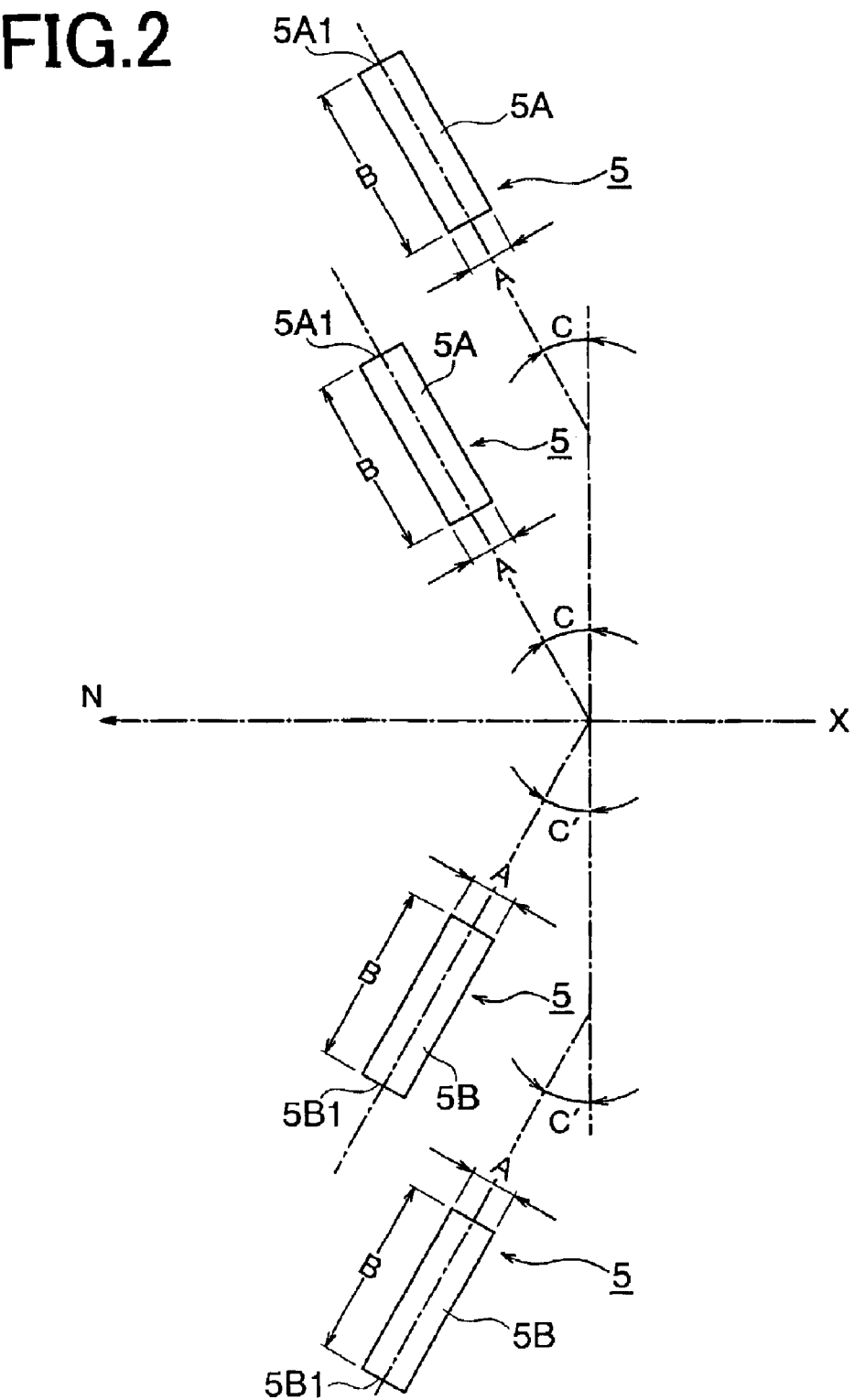
FIG. 2 is a top view showing a portion of a dimple arrangement representing a second embodiment related to the present invention.

FIG. 2 shows an enlarged view of two dimples on both sides with respect to the boundary reference line X of a second embodiment of the present invention.

In the arrangement of inclined dimples 5 of the sliding face 3, a plurality of outer circumferential dimples 5A and inner circumferential dimples 5B are located in mirror symmetry positions with respect to the boundary reference line X and both dimples are lined up along one radial line. This line of dimples 5A, 5B is duplicated along the circumference of the sliding face 3 such that a plurality of equally spaced lines are formed in a radialized manner.

Shape of the dimples 5 of the second example is an oblong. Width A of the rectangle of the dimple 5 is in a range of from $50 \times 10^{-6}$ m to $1000 \times 10^{-6}$ m. Longitudinal length B is more than twice of the width A and less than one half of the width of the sliding face (distance between the inner diameter and the outer diameter of the sliding face). Depth of the dimple 5 is in a range of from $1 \times 10^{-6}$ m to $25 \times 10^{-6}$ m.

In the dimple 5A on the outer circumferential side, a forward edge 5A1 relative to the rotary direction N or relative rotary direction N is inclined toward the rotary direction and the outer circumferential side with respect to the boundary reference line X. This inclination angle C is 30 degrees with respect to a radial direction.

The inclination angle C is determined based on the design of friction coefficient, seal ability and so on. It has been found that decreasing this inclination angle C leads to an improved seal ability. It also has been found that increasing the angle C tends to decrease frictional resistance.

The inclination angle C of the outer circumferential dimple 5A is in a range of from 30 to 85 degrees, preferably from 45 to 80 degrees for having an effect of reduced friction coefficient.

Likewise, in the dimple 5B on the inner circumferential side, a forward edge 5B1 relative to the rotary direction N of the sliding element or relative rotary direction N is inclined toward the rotary direction and the inner circumferential side with respect to the boundary reference line X. This inclination angle C' is 30 degrees with respect to a radial direction.

The inclination angle C' is determined based on the design of friction coefficient, seal ability and so on. Increasing the angle C' tends to decrease frictional resistance while increasing the number of the inner circumferential dimples 5B improves the seal ability. The inclination angle C' of the inner circumferential dimple 5B is in a range of from 30 to 85 degrees, preferably from 45 to 80 degrees for having an effect of reduced friction coefficient.

In case that a process fluid is located around the outer circumference of the sliding element 2, making the inclination angle of the inner circumferential dimples 5B larger than that of the outer circumferential dimples tends to yield a better seal performance. Also when the fluid is located in the inner circumferential side, the angle relationship is reversed relative to the case in which the fluid is around the outer circumference.

Figure 3:
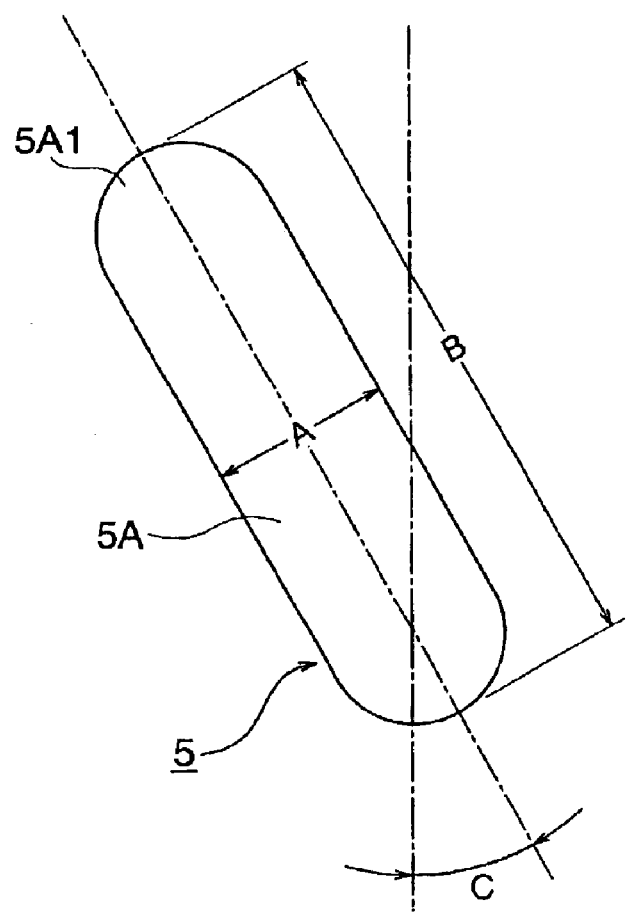
FIG. 3 is a top view showing a dimple of a third example related to the present invention.

FIG. 3 shows dimples 5 of a third example. Inclination angle C of the dimple shown in FIG. 3 is nearly the minimum angle 30 degrees. In the outer circumferential dimple 5A, its forward edge 5A1 relative to the rotary direction is shaped a circular arc. So is the backward edge. Elliptical shape of a dimple when viewed from the top is further introduced as a fourth embodiment although not schematically shown. These dimples 5 are arranged in a similar dimensional relation to what is described for the first embodiment. Individual dimples 5 on the sliding face 3 may be prepared to have a guitar shape when viewed from the top.

Thus, enhancing the shape of the dimples 5 will provide improvement of the seal ability and friction coefficient of the sliding face 3.

Furthermore, choosing a right combination of the inclination angles C, C' and the number of dimples 5 will not only decrease the friction coefficient but also improve the seal ability.

Figure 4:
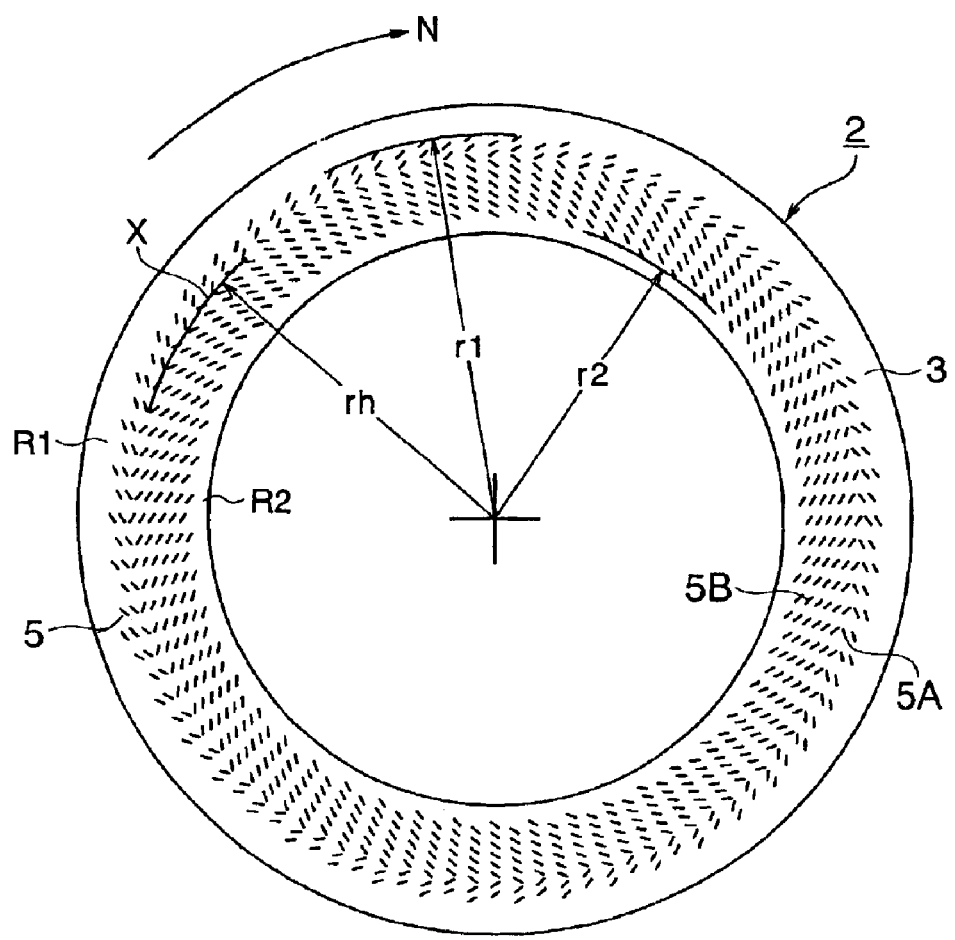
FIG. 4 is a top view of a sliding face of a sliding element representing a third embodiment related to the present invention.

FIG. 4 shows an arrangement of dimples 5 of a sliding face of a sliding element as a third embodiment according to the present invention.

The arrangement of the dimples 5 corresponds to a case in which a process fluid is located around the outer circumference of the sliding face. In this sliding face 3, the number of the inner circumferential dimples 5B is 6 while the number of the outer circumferential dimples 5A is 2 which is chosen less than 6 for the outer circumferential dimples 5B. The shape of the dimples 5 can be varied as shown in the first, the second, the third and the fourth examples.

As exemplified above, an appropriate choice of the shape of the dimple 5, respective numbers of the disposed outer circumferential dimples and inner circumferential dimples, and the inclination angles C, C' of the dimples 5 will improve a seal performance as well as a sliding friction.

In a sliding element 2 of the third embodiment, since more dimples 5B are disposed in the inner circumferential side, a pumping effect by these many dimples enhances seal ability. Also increasing the disposition angle of the dimples 5 on the sliding face 3 will be able to decrease a sliding friction.

Form such as a depth of the dimple 5 is preferably able to resist against abrasion dust. Contour and inclination angle relative to a rotational direction of the dimple 5 also are to be prepared for bearing a wear resistance against abrasion dust. A film thickness of the process fluid increased by the contour and inclination angle prepared as such will present abrasion.

Fabrication of the dimples 5 can be done utilizing a photosensitive film for sand blasting. In this method, a photosensitive film for sand blasting is placed on the sliding face 3. A positive film on which arrays of dimples 5 are printed is closely placed on the photosensitive film, and the photosensitive film is subjected to an exposure. The photosensitive film then is developed and a subsequent sand blasting provides dimples which are identical to those printed on the positive film. The photosensitive film for sand blasting is developed with a positive film built from CAD data. Thus, a preparation of the dimples' form is made quite easy.

As an alternative fabrication method, a reaction with a solid metal or the like can be utilized to fabricate dimples 5.

Figure 5:
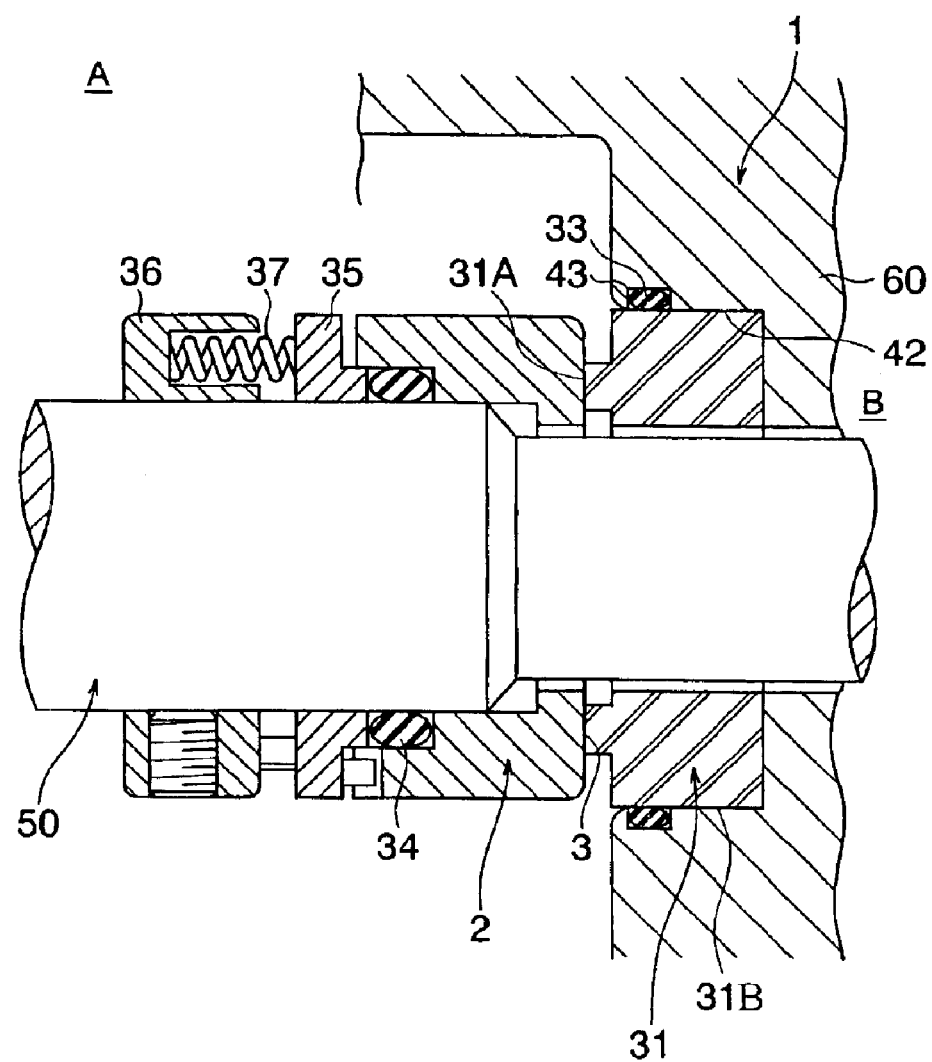
FIG. 5 is a cross-sectional view of a mechanical seal installing a sliding element related to the present invention.

FIG. 5 is a cross-sectional view of a mechanical seal 1 being equipped with a sliding element 2 of the present invention.

The mechanical seal 1 is disposed in a space between a rotary shaft 50 and a housing 60. The sliding element 2 is fitted over the rotary shaft 50 as a rotary seal ring 2 via O-ring 34 in an axially movable manner. The rotary seal ring 2 is resiliently urged by a coil spring 37 via O-ring gland 35 which also is fitted over the rotary shaft 50. The coil spring 37 is supported by a supporting portion 36 which is securely fitted to the rotary shaft 50.

Rotary seal ring 2 is urged by the coil spring 37 such that the sliding face 3 makes a sealing contact with an oppositely facing seal face 31A of a stationary seal ring 31. Outer diameter surface 31B of the stationary seal ring 31 is fixedly fitted into an installation cavity 42 of the housing 60. An O-ring groove 43 is disposed at the interface between the stationary seal ring 31 and the housing 60, and O-ring 33 is installed in the O-ring groove 43 for sealing the interface between the stationary seal ring 31 and the housing 60 in which the installation cavity is located.

Thus, the process fluid side A and the atmospheric side B are sealingly separated from each other by having a sealing contact between the seal face 3 of the rotary seal ring 2 and the opposing seal face 31A of the stationary seal ring 31.

The sliding element of the present invention in FIG. 5 is used as a rotary seal ring 2. It, however, can be used as a stationary seal ring 31 as well. Also it is possible to use the sliding element 2 for the both sides of the rotary seal ring 2 and the stationary seal ring 31.

The sliding element 2 is made of a sintered sliding material containing carbide such as silicon carbide, titan carbide or tungsten carbide. Also a super hard alloy such as tungsten tool steel, tungsten high-speed steel or the like can be used as a material for the sliding element 2. Use of such hard alloy becomes feasible because the sliding face 3 of the sliding element 2 has dimples 5 on it.

Figure 6:
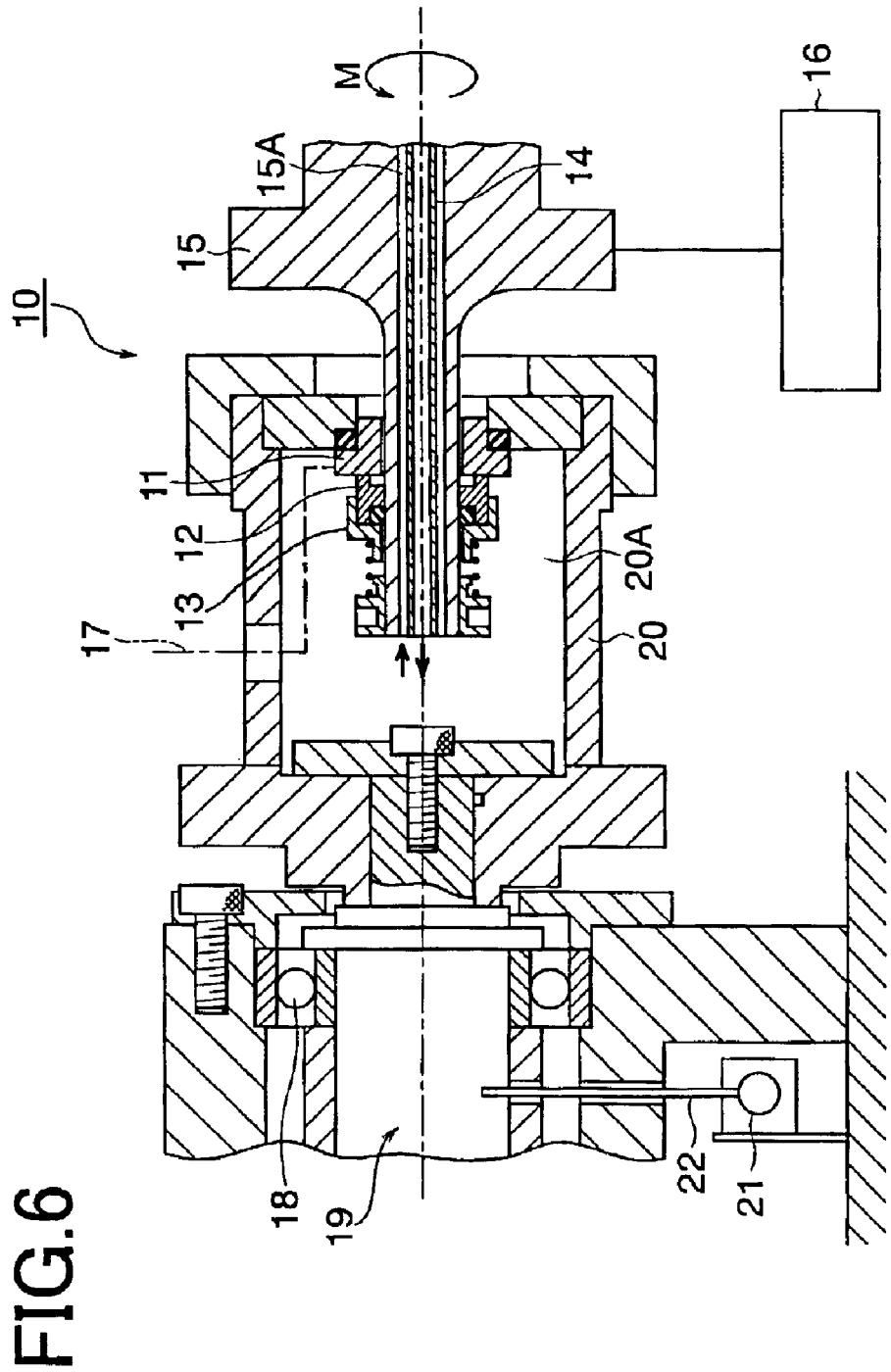
FIG. 6 is a cross-sectional view of a testing apparatus of a sliding element related to the present invention.

Testing apparatus 10 for the sliding element 2 shown in FIG. 6 retains a rotatable, cylindrical housing 20 along the center axis. A stationary seal ring 11 is sealingly fitted via O-ring to a mating surface disposed in a process fluid chamber 20A within the housing 20. The rotary seal ring 12 is resiliently urged by a spring in an axially movable manner relative to a retainer 13 which is fixed to the rotary shaft 15. And the sealing contact of the seal face of the rotary seal ring 12 and the opposite seal face of the stationary seal ring 11 prevents the fluid inside the process fluid chamber 20A from leaking to the ambient.

A drain passage 15A is disposed along the axis of the rotary shaft 15 driven by a motor 16. A supply passage 14 is disposed inside the drain passage 15A by extending through the drain passage 15A. Process fluid, e.g., oil, introduced from the supply passage 14 is provided into the process fluid chamber 20A and is ejected from the drain passage 15A. Ends of the drain passage 15A and the supply passage 14 are connected to a circulation pipe, which is not shown in the figure, and a pump connected to the pipe circulates the fluid modulated at a specific temperature and pressure. The rotational speed of the motor 16 can be controlled by an inverter which is not shown in the figure.

The housing 20 retaining the stationary seal ring 11 is fixed to the shaft 19 which is supported by a bearing 18 in a freely rotatable manner. Thus, the housing 20 is rotatable by a sliding friction which is caused by a relative rotation of the stationary seal ring 11 and the rotary seal ring 12.

A hole which diameter is 2 mm is disposed in 1 mm away from the opposing seal face of the stationary seal ring 11 and the hole is connected to an end of a conductive line such as PlatinumRhodium-Platinum or Alumel-Chromel which other end is connected to a thermo-electric thermometer which is not shown in the figure. Temperature of the sliding face of the stationary seal ring 11 is measured by the thermo-electric thermometer.

Support block which supports the shaft 19 is equipped with a load cell 21 and a sliding torque M can be measured by way of a cantilever 22. Frictional coefficient F then is computed from the sliding torque M. Its deriving formula is F=M/(W×Rm) where W is a load and Rm is an average radius of the sliding face.

This testing apparatus is internal-flow unbalancing type, and the seal face is urged by the fluid pressure and the resiliently urging force of a spring. In case of a zero fluid pressure, the sliding face is urged by the spring of the retainer alone. Measured items by this testing apparatus include the sliding torque M of the sliding element 2, temperature of the sliding face, fluid temperature and a volume of the fluid leaked through the sliding face.

TESTING EXAMPLE 1

Example 1 of the present testing represents testing results for the sliding element 2 shown in FIG. 1. The sliding element 2 is tested by the testing apparatus 10 which is shown in FIG. 6.

The sliding conditions are as follows.
1) Sliding Element 2

The rotary seal ring is a silicon carbide sliding element (inner diameter 25 mm, outer diameter 44 mm, length 12 mm), and The stationary seal ring is also a silicon carbide sliding element (inner diameter 28 mm, outer diameter 50 mm, length 14 mm).

Sliding face 3 of one of the seal rings retains dimples 5 on it and the other sliding face 3 forms a smooth plane without dimples 5.

A form and an arrangement of the dimples 5 is as shown in FIG. 1 or FIG. 2. That is, the width A of the dimple is 150×10$^{-6}$ m, the length B 600×10$^{-6}$ m, and the depth 8×10$^{-6}$ m. Ratio of the surface area of all the dimples 5 relative to the total area of the sliding face is 8%.

The inner inclination angle C and the outer inclination angle C' of the dimple 5 are both 60 degrees (30 degrees with respect to the boundary reference line X).

2) Surface roughness of the sliding face is Rz 0.2×10$^{-6}$ m,
3) flatness is 1 band (helium light),
4) testing duration is 30 minutes,
5) temperature of the process fluid is 30 degree Celsius,
6) fluid pressure is 0.07 MPa,
7) circumferential edge velocity is 1, 2, 5, 10 m/s,
8) spring load is 20N,
9) radius Rh of the boundary reference line is 18 mm,
10) process fluid is Super Multi Oil 10 manufactured by IDEMITSU Co., Ltd.

Testing results of the friction coefficients obtained according to the above conditions are given in Table 1. Ratio (%) of the friction coefficient for sliding of the aforementioned sliding element 2 relative to the friction coefficient for the sliding of two smooth surfaces without dimples [ratio of the friction coefficient of the sliding element 2 over the friction coefficient of the sliding face without dimples] is shown in Table 2. Leakage of the fluid (g/h) is further given in Table 3. In the following tables, A is a sliding velocity (m/s) of the sliding element 2 while B is a fluid pressure (MPa).

TABLE 1

| | Friction coefficient | | | |
|---|---|---|---|---|
| | A(m/s) | | | |
| B(MPa) | 1 | 2 | 5 | 10 |
| 0 | 0.044 | 0.106 | 0.239 | 0.332 |
| 0.07 | 0.004 | 0.017 | 0.056 | 0.126 |

TABLE 2

| Ratio of the friction coefficient of a sliding element with dimples relative to that without dimples (%) | | | | |
|---|---|---|---|---|
| | A(m/s) | | | |
| B(MPa) | 1 | 2 | 5 | 10 |
| 0 | 4% | 9% | 17% | 20% |
| 0.07 | 1% | 4% | 10% | 20% |

TABLE 3

| Leakage of a process fluid (g/h) | | | | |
|---|---|---|---|---|
| | A(m/s) | | | |
| B(MPa) | 1 | 2 | 5 | 10 |
| 0 | 0.000 | 0.000 | 0.000 | 0.000 |
| 0.07 | — | — | — | — |

Leakage of a process fluid (g/h) in Table 3 is examined. In case of 0 MPa of the fluid pressure, leakage of the fluid is also 0 g/h. In case of 0.07 MPa, however, there will be a very small amount of leakage of the fluid although the leakage is not significant enough to be able to be measured. This level of leakage is negligible according to the seal standards.

Generally speaking, a pumping effect caused by the dimples disposed on a sliding face 3 prevents a fluid from leaking. In case of 0.07 MPa of the fluid pressure, however, a tiny amount of the fluid leakage is considered to occur in accordance with the pressure increase.

Basis of this estimation is that the leaking amount of the fluid is proportional to the fluid pressure according to Poiseuille's theoretical equation regarding a radial leakage between the sliding faces of a stationary seal ring and a rotary seal ring which are in parallel with each other.

EXAMPLE 2

The next example 2 is with regard to the testing results of a sliding element 2 shown in FIG. 4. In this sliding face, a ratio of the array width r1-rh of the outer circumferential dimples 5A against the array width rh-r2 of the inner circumferential dimples 5B is chosen to be one third. Other conditions in the example 2 remain the same as those in the example 1.

Testing results of friction coefficients for the sliding element 2 of the example 2 under these conditions are shown in Table 4. Ratio (%) of the friction coefficient for the example 2 relative to the friction coefficient for the sliding of two smooth surfaces without dimples [ratio of the friction coefficient of the sliding element 2 over the friction coefficient of the sliding face without dimples] is shown in Table 5. Leakage of the fluid (g/h) is further given in Table 6.

TABLE 4

Friction coefficient

| B(MPa) | A(m/s) | | | |
|---|---|---|---|---|
| | 1 | 2 | 5 | 10 |
| 0 | 0.230 | 0.237 | 0.355 | 0.493 |
| 0.07 | 0.125 | 0.130 | 0.112 | 0.170 |

TABLE 5

Ratio of the friction coefficient of a sliding element with dimples relative to that without dimples (%)

| B(MPa) | A(m/s) | | | |
|---|---|---|---|---|
| | 1 | 2 | 5 | 10 |
| 0 | 21% | 19% | 25% | 30% |
| 0.07 | 41% | 29% | 20% | 27% |

TABLE 6

Leakage of a process fluid (g/h)

| B(MPa) | A(m/s) | | | |
|---|---|---|---|---|
| | 1 | 2 | 5 | 10 |
| 0 | 0.000 | 0.000 | 0.000 | 0.000 |
| 0.07 | 0.000 | 0.000 | 0.000 | 0.000 |

EXAMPLE 3

1) Testing Conditions

A sliding element 2 of the example 3 was subjected to experiments under the same conditions by the same testing apparatus as those used in the example 1.

2) Sliding Element 2

(1) This sliding element 2 has a sliding face whose form and shape is identical with that of the element 2 shown in FIG. 4. That is, a ratio of the array width r1-rh of the outer circumferential dimples 5A against the array width rh-r2 of the inner circumferential dimples 5B is chosen to be one third.

(2) Material and diameters of a rotary seal ring: chromium molybdenum cast iron (25 mm in inner diameter, 44 mm in outer diameter and 12 mm in length)

(3) Material and diameters of a stationary seal ring: chromium molybdenum cast iron (25 mm in inner diameter, 50 mm in outer diameter and 14 mm in length)

(4) Diameters of a rotary sliding face: (32 mm in inner diameter and 40 mm in outer diameter)

(5) Rest of the conditions remains the same as those in the example 1.

Testing results with regard to friction coefficients obtained under these conditions are shown in Table 7. Ratio (%) of the friction coefficient for the example 3 relative to the friction coefficient for the sliding of two smooth surfaces without dimples [ratio of the friction coefficient of the sliding element 2 over the friction coefficient of the sliding face without dimples] is shown in Table 8. Leakage of the fluid (g/h) is further given in Table 9. It is noted that use of cast iron FC35 presents similar results.

TABLE 7

Friction coefficient

| B(MPa) | A(m/s) | | | |
|---|---|---|---|---|
| | 1 | 2 | 5 | 10 |
| 0 | 0.253 | 0.256 | 0.387 | 0.518 |
| 0.07 | 0.114 | 0.139 | 0.124 | 0.192 |

TABLE 8

Ratio of the friction coefficient of a sliding element with dimples relative to that without dimples (%)

| B(MPa) | A(m/s) | | | |
|---|---|---|---|---|
| | 1 | 2 | 5 | 10 |
| 0 | 24% | 21% | 27% | 31% |
| 0.07 | 37% | 31% | 22% | 31% |

TABLE 9

Leakage of a process fluid (g/h)

| B(MPa) | A(m/s) | | | |
|---|---|---|---|---|
| | 1 | 2 | 5 | 10 |
| 0 | 0.000 | 0.000 | 0.000 | 0.000 |
| 0.07 | 0.000 | 0.000 | 0.000 | 0.000 |

Table 7 and Table 8 which, respectively, represent friction coefficient of the example 3 and the ratio of the friction coefficient of a sliding element 2 relative to that without dimples (%) show that the friction coefficients are smaller than those shown in the corresponding tables for the reference example 1, Table 16 and Table 17. Thus, this proves that the sliding element 2 is effective for reducing friction. In particular, a low frictional heat generation in a high speed sliding motion prevents a seizure breakdown.

Table 9, leakage of a process fluid (g/h), shows that no fluid leakage is observed for an increasing fluid pressure. That is, the sliding element 2 is small in friction coefficient and excellent in seal performance.

EXAMPLE 4

1) Testing Conditions

A sliding element 2 of the example 4 was subjected to experiments under the same conditions by the same testing apparatus as those used in the example 1.

2) Sliding Element 2

(1) This sliding element 2 has a sliding face whose form and shape is identical with that of the element 2 shown in FIG. 4. That is, a ratio of the array width r1-rh of the outer circumferential dimples 5A against the array width rh-r2 of the inner circumferential dimples 5B is chosen to be one third.

(2) Material and diameters of a rotary seal ring: stainless steel (SUS420J2) (25 mm in inner diameter, 44 mm in outer diameter and 12 mm in length)

(3) Material and diameters of a stationary seal ring: stainless steel (SUS420J2) (25 mm in inner diameter, 50 mm in outer diameter and 14 mm in length)

(4) Diameters of a rotary sliding face: (32 mm in inner diameter and 40 mm in outer diameter)
(5) Rest of the conditions remains the same as those in the example 1.

Testing results with regard to friction coefficients obtained under these conditions are shown in Table 10. Ratio (%) of the friction coefficient for the example 4 relative to the friction coefficient for the sliding of two smooth surfaces without dimples [ratio of the friction coefficient of the sliding element 2 over the friction coefficient of the sliding face without dimples] is shown in Table 11. Leakage of the fluid (g/h) is further given in Table 12.

TABLE 10

| | Friction coefficient | | | |
|---|---|---|---|---|
| | A(m/s) | | | |
| B(MPa) | 1 | 2 | 5 | 10 |
| 0 | 0.242 | 0.244 | 0.369 | 0.542 |
| 0.07 | 0.120 | 0.133 | 0.119 | 0.183 |

TABLE 11

| Ratio of the friction coefficient of a sliding element with dimples relative to that without dimples (%) | | | | |
|---|---|---|---|---|
| | A(m/s) | | | |
| B(MPa) | 1 | 2 | 5 | 10 |
| 0 | 22% | 20% | 26% | 33% |
| 0.07 | 39% | 29% | 21% | 30% |

TABLE 12

| | Leakage of a process fluid (g/h) | | | |
|---|---|---|---|---|
| | A(m/s) | | | |
| B(MPa) | 1 | 2 | 5 | 10 |
| 0 | 0.000 | 0.000 | 0.000 | 0.000 |
| 0.07 | 0.000 | 0.000 | 0.000 | 0.000 |

Table 10 and Table 11 which, respectively, represent friction coefficient of the example 4 and the ratio of the friction coefficient of a sliding element 2 relative to that without dimples (%) show that the friction coefficients are smaller than those shown in the corresponding tables for the reference example 1, Table 16 and Table 17. Thus, this proves that the sliding element 2 is effective for reducing friction. In particular, a low frictional heat generation in a high speed sliding motion prevents a seizure breakdown.

Table 12, leakage of a process fluid (g/h), shows that no fluid leakage is observed for an increasing fluid pressure. That is, the sliding element 2 is small in friction coefficient and excellent in seal performance.

EXAMPLE 5

1) Testing Conditions

A sliding element 2 of the example 5 was subjected to experiments under the same conditions by the same testing apparatus as those used in the example 1.

2) Sliding Element 2

(1) This sliding element 2 has a sliding face whose form and shape is identical with that of the element 2 shown in FIG. 4. That is, a ratio of the array width r1-rh of the outer circumferential dimples 5A against the array width rh-r2 of the inner circumferential dimples 5B is chosen to be one third.

(2) Material and diameters of a rotary seal ring: silicon nitride (25 mm in inner diameter, 44 mm in outer diameter and 12 mm in length)

(3) Material and diameters of a stationary seal ring: silicon nitride (25 mm in inner diameter, 50 mm in outer diameter and 14 mm in length)

(4) Diameters of a rotary sliding face: (32 mm in inner diameter and 40 mm in outer diameter)

(5) Rest of the conditions remains the same as those in the example 1.

Testing results with regard to friction coefficients obtained under these conditions are shown in Table 13. Ratio (%) of the friction coefficient for the example 5 relative to the friction coefficient for the sliding of two smooth surfaces without dimples [ratio of the friction coefficient of the sliding element 2 over the friction coefficient of the sliding face without dimples] is shown in Table 14. Leakage of the fluid (g/h) is further given in Table 15.

TABLE 13

| | Friction coefficient | | | |
|---|---|---|---|---|
| | A(m/s) | | | |
| B(MPa) | 1 | 2 | 5 | 10 |
| 0 | 0.219 | 0.220 | 0.334 | 0.488 |
| 0.07 | 0.116 | 0.120 | 0.108 | 0.166 |

TABLE 14

| Ratio of the friction coefficient of a sliding element with dimples relative to that without dimples (%) | | | | |
|---|---|---|---|---|
| | A(m/s) | | | |
| B(MPa) | 1 | 2 | 5 | 10 |
| 0 | 20% | 18% | 24% | 29% |
| 0.07 | 38% | 27% | 19% | 27% |

TABLE 15

| | Leakage of a process fluid (g/h) | | | |
|---|---|---|---|---|
| | A(m/s) | | | |
| B(MPa) | 1 | 2 | 5 | 10 |
| 0 | 0.000 | 0.000 | 0.000 | 0.000 |
| 0.07 | 0.000 | 0.000 | 0.000 | 0.000 |

Table 13 and Table 14 which, respectively, represent friction coefficient of the example 5 and the ratio of the friction coefficient of a sliding element 2 relative to that without dimples (%) show that the friction coefficients are smaller than those shown in the corresponding tables for the reference example 1, Table 16 and Table 17. Thus, this proves that the sliding element 2 is effective for reducing friction. In particular, a low frictional heat generation in a high speed sliding motion prevents a seizure breakdown.

Table 15, leakage of a process fluid (g/h), shows that no fluid leakage is observed for an increasing fluid pressure. That is, the sliding element 2 is small in friction coefficient and excellent in seal performance.

Reference Example 1

Reference example 1 shows testing results of a sliding element for mechanical seals. This sliding element disposes a plurality of elliptical dimples on its sliding face in which a longitudinal direction of the dimple is vertical to a sliding direction and the dimples are equally spaced with each other radially and circumferentially. Width of the elliptical dimple is $50\times10^{-6}$ m, longitudinal length $200\times10^{-6}$ m and depth $8\times10^{-6}$ m. Distance between two circumferentially adjacent arrays of dimples on the sliding face is approximately $400\times10^{-6}$ m, and that between two radially adjacent arrays is about $200\times10^{-6}$ m. Ratio of the surface area of all the dimples relative to the total area of the sliding face is 8%.

Testing results of friction coefficients for the sliding element of the reference example 1 under these conditions are shown in Table 16. Ratio (%) of the friction coefficient for the reference example 1 relative to the friction coefficient for the sliding of two smooth surfaces without dimples [ratio of the friction coefficient of the reference example 1 over the friction coefficient of the sliding face without dimples] is shown in Table 17. Leakage of the fluid (g/h) is further given in Table 18.

TABLE 16

| | Friction coefficient | | | |
|---|---|---|---|---|
| | A(m/s) | | | |
| B(MPa) | 1 | 2 | 5 | 10 |
| 0 | 0.659 | 0.862 | 1.018 | 0.985 |
| 0.07 | 0.162 | 0.247 | 0.353 | 0.419 |

TABLE 17

| Ratio of the friction coefficient of a sliding element with dimples relative to that without dimples (%) | | | | |
|---|---|---|---|---|
| | A(m/s) | | | |
| B(MPa) | 1 | 2 | 5 | 10 |
| 0 | 61% | 70% | 72% | 59% |
| 0.07 | 53% | 55% | 62% | 68% |

TABLE 18

| | Leakage of a process fluid (g/h) | | | |
|---|---|---|---|---|
| | A(m/s) | | | |
| B(MPa) | 1 | 2 | 5 | 10 |
| 0 | 0.00 | 0.00 | 0.00 | 0.00 |
| 0.07 | 0.00 | 0.00 | 0.00 | 0.00 |

The above experiment results show that the friction coefficient ratio of the example 1 is less than one third relative to the reference example 1 in every case under common conditions.

Leakage of a process fluid of the example 2 is similar to that of the reference example 1, but friction coefficient ratio of the former is decreased to less than 28% at maximum relative to that of the latter.

In the example 3, a fluid leakage (g/h) is hardly observed relative to the reference example 1 while the friction coefficient ratio is decreased to less than 30% at maximum with respect to the reference example 1.

Further in the example 4, a fluid leakage (g/h) is hardly observed relative to the reference example 1 while the friction coefficient ratio is decreased to less than 29% at maximum with respect to the reference example 1.

Yet in the example 5, a fluid leakage (g/h) is hardly observed relative to the reference example 1 while the friction coefficient ratio is decreased to less than 26% at maximum with respect to the reference example 1.

Figure 7:
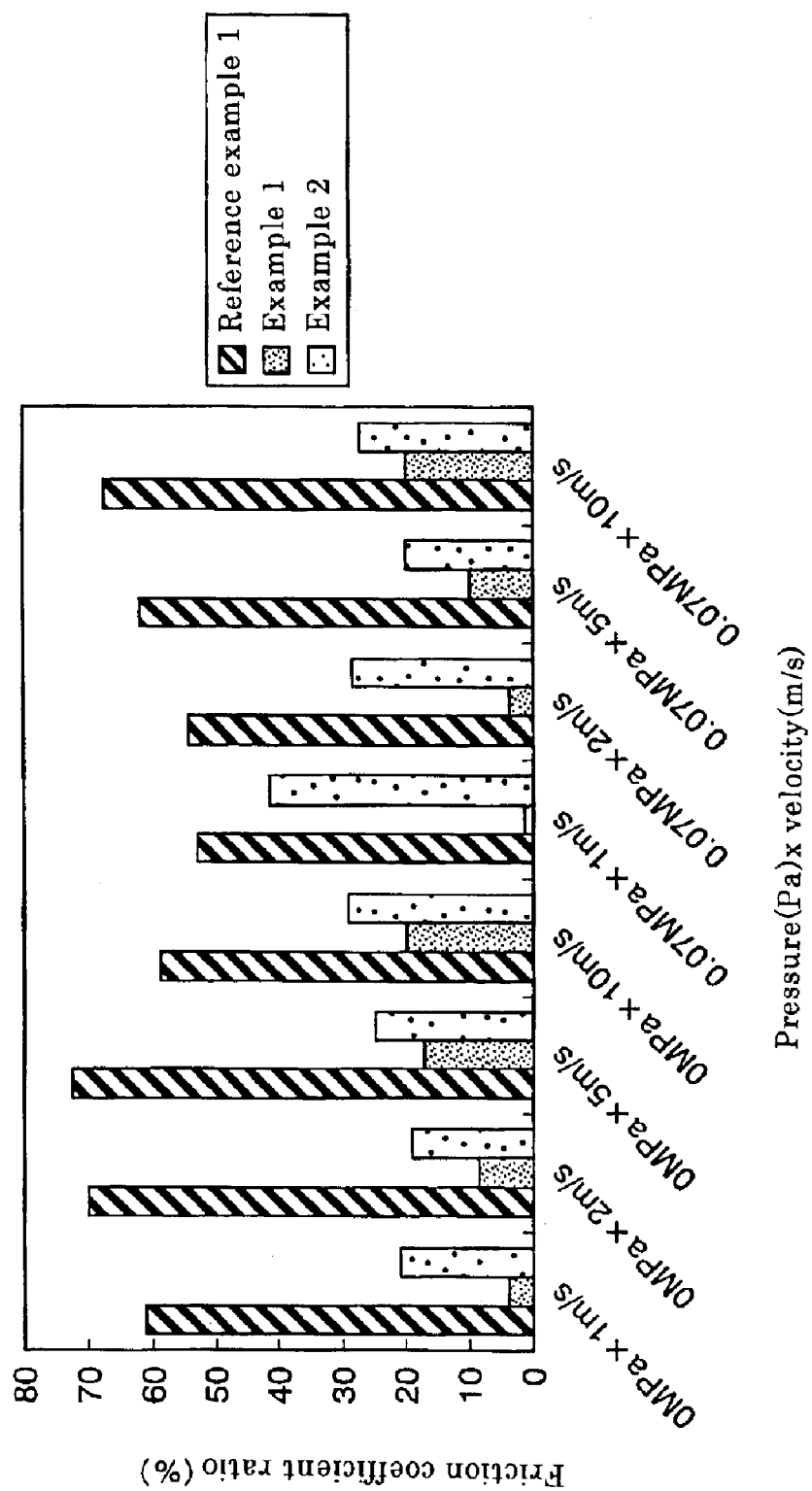
FIG. 7 is a graphic chart showing a comparison in friction coefficients for sliding element examples related to the present invention and a reference example without dimples.
Figure 8:
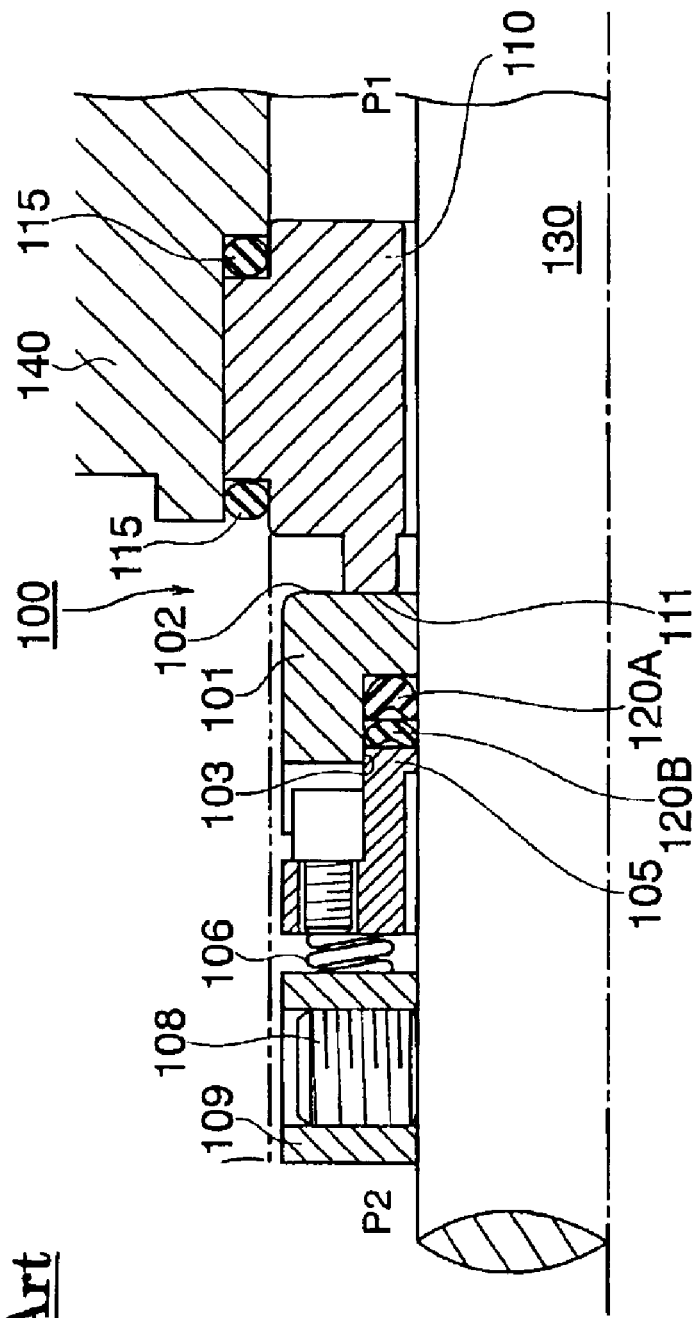
FIG. 8 is cross-sectional view of a mechanical seal related to the prior art.
Figure 9:
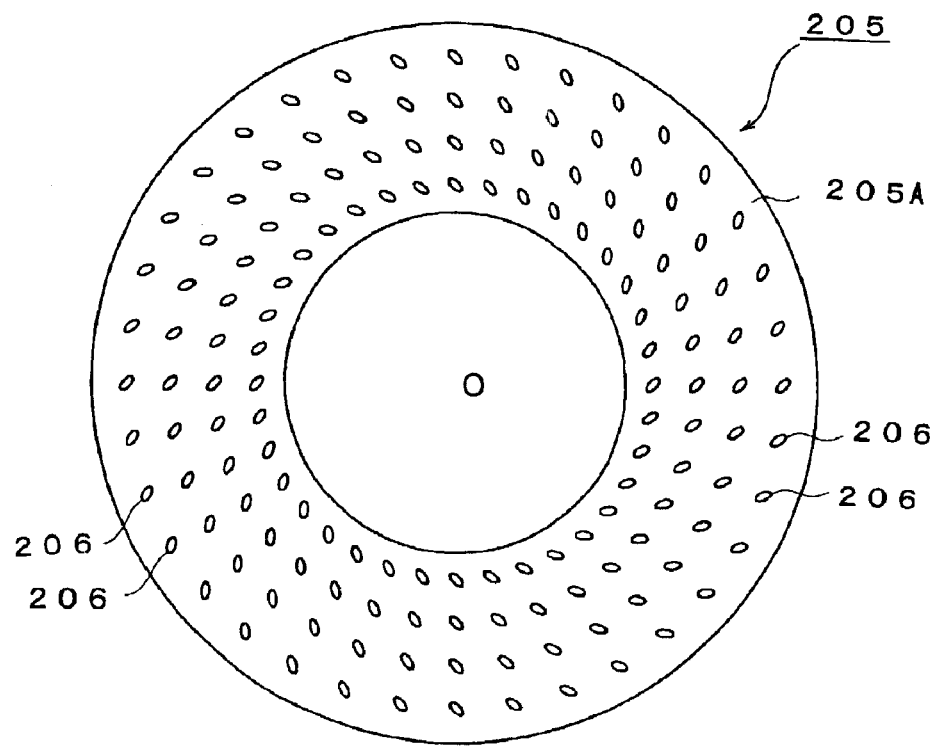
FIG. 9 is a top view of a sliding face of a sliding element related to the prior art.

According to the above testing results, ratios (%) of the friction coefficient of a sliding element with dimples relative to that without dimples for the sliding element 2 in the examples 1 and 2 as well as the sliding element in the reference example are displayed in FIG. 7. Since the examples 3, 4, 5 only end up with similar charts, they are not presented here.

It is clearly seen in FIG. 7 that all the values including a friction coefficient for the example 1, example 2, example 3, example 4 and example 5 are reduced relative to those in the reference example 1.

Furthermore, in the example 3, example 4 and example 5, a sliding element without dimples 5 even made of a same material as that used for the sliding element 2 will be prone to a seizure breakdown under a high speed rotation. However, dimples 5 disposed on the sliding face 3 in accordance with the present invention are able to prevent such a seizure. In addition, a sliding element 2 with dimples 5 being made of cast iron, stainless steel or silicon nitride does not present a sign of crack on its sliding face even under a cold temperature, while a sliding element without dimples made of silicon carbide shows a presence of cracks at a cold temperature in an arctic region. Thus, durability of the sliding element is improved.

Sliding element 2 of the present invention can be utilized for an application which has a sliding face such as a bearing, a cylinder or the like.

Embodiments of other inventions relative to the present invention will be described below.

A sliding element 2 as a preferred embodiment of a second present invention retains outer circumferential dimples 5A and inner circumferential dimples 5B both of which are lined up in one line and are inclined such that the outer circumferential dimples 5A are arranged in mirror symmetry relative to the inner circumferential dimples 5B. A plurality of such dimple arrays are disposed circumferentially.

In the sliding element related to the second present invention, since the dimples 5A and 5B are arranged in mirror symmetry, a sealing film of process fluid is collected to a neighborhood of the boundary reference line X by the inner and outer circumferential dimples 5A, 5B, and the sealing film of the fluid located between the sliding faces 3 is expected to improve not only a friction coefficient but also a seal performance.

In a sliding element as a preferred embodiment of a third present invention, the number of outer circumferential dimples 5A is arranged smaller than that of inner circumferential dimples 5B. Thus, the dimples 5A located in the fluid side are fewer.

In the sliding element related to the third invention, when a process fluid is located around the outer circumference, increasing the number of the inner circumferential dimples 5B provides for pushing back the fluid toward the outer circumferential side. Likewise, when the fluid is located in the inner circumferential side, increasing the number of the outer circumferential dimples 5A provides for pushing back the fluid toward the inner circumferential side. Therefore, the seal performance is significantly improved. Also the fluid film located between the sliding faces effectively decrease the friction coefficient of the sliding faces.

In a sliding element related to a fourth present invention, the shape of the dimple when viewed from the top is elliptical or oblong. Width of the dimple is in a range of from $50 \times 10^{-6}$ m to $1000 \times 10^{-6}$ m, its longitudinal length is more than twice of the width as well as less than one half of the width of the sliding width, and the depth of the dimple is in a range of from $1 \times 10^{-6}$ m to $25 \times 10^{-6}$ m.

The sliding element related to the fourth present invention, according to the experimental results, is contained in a region of the maximum seal performance as well as in a region of the minimum friction coefficient. Therefore, the shape of the dimples can be chosen from the overlapping region to satisfy both.

A sliding element 2 related to a fifth present invention is made of a material containing carbides such as silicon carbide, titan carbide, tungsten carbide or the like.

In a sliding element 2 related to the fifth invention, the material chosen can not only decrease the friction coefficient but also reduce a squeaking noise or a linking during the sliding. Also a relative sliding motion of the sliding element 2 with an opposing sliding element being made of carbon material can prevent Blister effect.

Merits of the present invention will be described below.

According to a silicon carbide sintered element related to the present invention, the aforementioned arrangement described in the first invention through the third invention disposing outer circumferential dimples 5A which longitudinally forward edge relative to a rotational direction are inclined toward the outer circumference and inner circumferential dimples 5B which longitudinally forward edge relative to a rotational direction are inclined toward the inner circumference creates a fluid film between the outer circumferential dimples 5A and the inner circumferential dimples 5B and maintains the lubrication film of the fluid on the sliding face 3. Thus, the seal performance will be improved.

The lubrication film maintained can effectively decrease the friction coefficient of the sliding face 3. As the result, heat generation on the sliding face 3 will be reduced.

Inclined dimples 5 disposed in a mirror symmetric manner provide an effect of collectively concentrating the sealing film of the fluid onto the neighborhood of the boundary reference line X by means of the outer and inner circumferential dimples 5A, 5B. Thus, the fluid sealing film between the sliding faces 3 will enhance the seal performance as well as the friction coefficient.

Furthermore, a plurality of dimples 5B located on the opposite side relative to the process fluid of the sliding face 3 push back the fluid toward the fluid side. This will significantly improve the seal performance against the fluid. Also the lubrication film of the fluid located between the sliding faces 3 will decrease the friction coefficient of the sliding face 3.

The sliding element 2 related to the aforementioned fourth invention is covered by the regions of a maximum seal performance as well as a minimum friction coefficient. Therefore, an optimal effect having both merits will be materialized.

Furthermore, the aforementioned sliding element 2 of the fifth invention being made of carbide not only decreases a friction coefficient but also prevents a squeaking noise or linking from occurring during the sliding. Also a relative sliding motion of the sliding element 2 with an opposing sliding element being made of carbon material can prevent Blister effect.

Sliding element 2 of the sixth and seventh inventions made of cast iron, stainless steel or silicon nitride can not only decrease a friction coefficient but also prevent cracks on its sliding face from being developed under a cold temperature. Therefore durability as well as seal performance will be enhanced. Furthermore, a seizure of a sliding face under a high speed sliding motion will also be effectively prevented. Use of the sliding element as a piston ring or the like also decreases a friction coefficient and improves durability.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A sliding element for providing a seal between sliding faces of a pair of relatively slidable components,
   one of said components being a stationary sliding element and the other of said components being a rotary sliding element,
   said sliding faces retaining a plurality of elongate dimples in an inner circumferential side and an outer circumferential side with respect to a boundary reference line,
   said dimples disposed in said inner circumferential side being inclined toward a different direction from said dimples in said outer circumferential side,
   forward edges of said dimples relative to a rotational direction disposed in said outer circumferential side being inclined toward said outer circumference,
   forward edges of said dimples relative to the rotational direction disposed in said inner circumferential side being inclined toward said inner circumference,
   a plurality of radial lines,
   said dimples located in said outer circumferential side and said inner circumferential side being disposed along a radial line of said plurality of radial lines,
   said plurality of said radial lines being disposed along a circumferential direction in a radicalized manner, and
   along each radial line of said plurality of radial lines, at least two dimples in said inner circumferential side and at least two dimples in said outer circumferential side are arranged to form a plurality of circles of dimples in each of said inner and outer circumferential sides.

2. A sliding element for providing a seal against a process fluid between sliding faces of a pair of relatively slidable components,
   one of said components being a stationary sliding element and the other of said components being a rotary sliding element,
   the process fluid being located around either inner circumference or outer circumference of said sliding faces,
   said sliding faces retaining a plurality of elongate dimples in an inner circumferential side and an outer circumferential side with respect to a boundary reference line,
   said dimples disposed in said inner circumferential side being inclined toward a different direction from said dimples in said outer circumferential side,
   a plurality of radial lines, said dimples located in said outer circumferential side and said inner circumferential side being disposed along a radial line of said plurality of radial lines and inclined in a mirror symmetric manner relative to each other, said plurality of said radial lines being disposed along a circumferential direction in a radicalized manner, and along each radial line of said plurality of radial lines, at least two dimples in said inner circumferential side and at least two dimples in said outer circumferential side are arranged to form a plurality of circles of dimples in each of said inner and outer circumferential sides.

3. The sliding element as in claim 1, wherein a number of said dimples disposed in one of said outer circumferential side and said inner circumferential side and located adjacent to said process fluid is smaller than a number of said dimples disposed in the other of said outer circumferential side and said inner circumferential side and located further from said process fluid.

4. The sliding element as in claim 1, wherein a shape of each dimple viewed from the top is elliptical or oblong and a width of said each dimple is in a range of from $50 \times 10^{-6}$ m to $1000 \times 10^{-6}$ m and a length of said each dimple is more than twice of said width and less than one half of a width of said sliding face and a depth is in a range of from $1 \times 10^{-6}$ m to $25 \times 10^{-6}$ m.

5. The sliding element as in claim 1, wherein said sliding element is made of a material containing at least one carbide selected from a group including silicon carbide, titan carbide, and tungsten carbide.

6. The sliding element as in claim 1, wherein said sliding element is made of cast iron, stainless steel or silicon nitride.

7. The sliding element as in claim 2, wherein said sliding element is made of cast iron, stainless steel or silicon nitride.

8. The sliding element as in claim 1, wherein all of said dimples are substantially the same shape and dimension and said dimples in said outer circumferential side have different inclining angles than said dimples in said inner circumferential side.

9. The sliding element as in claim 2, wherein all of said dimples are substantially the same shape and dimension and said dimples in said outer circumferential side have different inclining angles than said dimples in said inner circumferential side.

10. The sliding element as in claim 1, wherein each of said dimples is substantially straight shaped.

11. The sliding element as in claim 2, wherein each of said dimples is substantially straight shaped.

* * * * *